United States Patent
Mouchel La Fosse

(10) Patent No.: US 7,668,753 B2
(45) Date of Patent: Feb. 23, 2010

(54) ON-LINE SERVICE PROVISION METHOD, AND EQUIPMENT FOR IMPLEMENTING SUCH A METHOD

(75) Inventor: Jean-Pierre Mouchel La Fosse, Saint-Yrieix-la-Perche (FR)

(73) Assignee: France Telecom, Paris (FR)

( * ) Notice: Subject to any disclaimer, the term of this patent is extended or adjusted under 35 U.S.C. 154(b) by 951 days.

(21) Appl. No.: 10/534,437

(22) PCT Filed: Oct. 6, 2003

(86) PCT No.: PCT/FR03/02928

§ 371 (c)(1), (2), (4) Date: May 10, 2005

(87) PCT Pub. No.: WO2004/047369

PCT Pub. Date: Jun. 3, 2004

(65) Prior Publication Data

US 2006/0167755 A1    Jul. 27, 2006

(30) Foreign Application Priority Data

Nov. 13, 2002    (FR) .................................. 02 14210

(51) Int. Cl.
*G06Q 30/00* (2006.01)
(52) U.S. Cl. ........................... 705/26; 455/405; 707/10; 707/26; 706/47
(58) Field of Classification Search ................. 455/405; 707/10; 706/47; 705/26
See application file for complete search history.

(56) References Cited

U.S. PATENT DOCUMENTS 5,987,464 A * 11/1999 Schneider ..................... 707/10
6,442,549 B1 * 8/2002 Schneider ..................... 707/10
7,222,113 B2 * 5/2007 Katz ............................ 706/47

FOREIGN PATENT DOCUMENTS

WO    WO 01/86881 A2    11/2001

* cited by examiner

*Primary Examiner*—David Q Nguyen
(74) *Attorney, Agent, or Firm*—Drinker Biddle & Reath LLP

(57) ABSTRACT

A service session supervision platform is disposed between an access network and an input node of a service-hosting network. During the provision of a service, at least one atomic section is first defined. Such atomic section consists of a determined sequence of events which are involved in message exchanges with a subscriber. The supervision platform detects and flags events forming the beginning or end of an atomic section in a service session in progress for a subscriber by means of the access network. A communication interrupt request from a subscriber is processed by ascertaining if an atomic section is in progress for this subscriber according to the atomic section beginnings and ends flagged by the supervision platform, in order to determine whether or not the communication must be interrupted immediately.

10 Claims, 3 Drawing Sheets

ON-LINE SERVICE PROVISION METHOD, AND EQUIPMENT FOR IMPLEMENTING SUCH A METHOD

CROSS-REFERENCE TO RELATED APPLICATIONS

This application is the U.S. national phase of the PCT/FR2003/002928 filed Oct. 6, 2003, which claims the benefit of French Application No. 02 14210 filed Nov. 13, 2002, the entire content of which is incorporated herein by reference.

BACKGROUND OF THE INVENTION

The present invention relates to on-line service mediation techniques.

In particular, it relates to content services that can be supplied via third generation (3G) cellular radio communication networks of the UMTS type (Universal Mobile Telecommunications System). It is more generally of interest to Internet service providers (ISP), whether the subscriber access is by radio, by wire or by other means. The term "3G services" is used below to denote the services affected by the invention, without this being in any way limiting.

The rating of these services is difficult to perfect. The service providers put in place an information system (IS) to deal with customer care and billing (CC&B). These ISs provide them with the ability to rate the 3G services with a large number of metrics available to differentiate these services in terms of rating and billing.

For this, the manufacturers offer platforms to provide SCP-type content mediation (SCP being an intelligent network term standing for "service control point"). These manufacturers include NARUS, ENITION, VoluBill, P-Cube, etc.

All these platforms provide a functionality for analyzing and supervising IP (Internet Protocol) packets exchanged within the context of 3G service sessions initiated by the user of a 3G terminal or of a workstation connected to the Internet. They have the ability to analyze the information encapsulated in the IP packets up to layer 7 (Application) of the OSI protocol architecture model. This enables them to apply rating metrics taking into account IP addresses, TCP (Transmission Control Protocol) ports, URL (Uniform Resource Locator) resources, etc.

These platforms are normally incorporated in the same place in the IS domain of the CC&B: between the endpoint node of the access network (3G cellular or fixed line), and the first node of the IP network hosting 3G services (ISP network or Internet network). This first input node in the 3G services IP network is most often a 3G services "portal".

Some of these platforms, for example the "NetToll" platform marketed by ENITION, have a functionality enabling the 3G service provider to be autonomous in the phase of creating his 3G services. A protocol (called "NetPolicy" in the case of the "NetToll" platform) enables the 3G service provider to define and create all the data that makes up the information model of his new 3G service. The 3G service provider thus himself creates all the data relating to the new service in the database forming the service reference base of the "SCP-Like Content Mediation" platform.

For the rating of 3G services, the most difficult problems to resolve in this IS domain of the CC&B stem:

from the current impossibility of guaranteeing a quality of service (QoS) that is completely deterministic for the "delivery" of the 3G services;

from the "multi-session" nature of the technologies supporting these services (UMTS and its upgrades, or IP fixed networks). This means that, for example, the end user of a 3G terminal (mobile phone, personal digital assistant, etc.) can set up a plurality of 3G service sessions running in parallel.

Any mechanism that helps to improve the QoS perceived by the user who sets up 3G service sessions is desirable to facilitate the hitherto slow take-off of the 3G services.

A particular problem is that of the perception by the end user of certain communication interruptions which can be due to various reasons. In the absence of particular precautions, there is a risk of such an interruption being perceived very abruptly by the customer, which may discourage the customer from subscribing to this type of service. The success of a new 3G service runs the risk of being compromised if it brings into play circumstances in which such an abrupt interruption is particularly disagreeable to the customer (for example, if he does not know whether his bank account has been debited).

The 3G service session interruption decision situations include in particular the following:

detection by the rating system that a zero threshold is reached on the account associated with the rating of a service (for example, the account associated with the rating of the service transport part);

certain legal obligations, such as the protection of underage persons with respect to "addictive" behaviors that urge them toward excessive consumption;

for companies, the needs to protect and monitor the consumption of "enterprise" type 3G services by their field or office employees etc.

An object of the present invention is to propose a mechanism for improving the ergonomics of the on-line services, in particular in cases of involuntary communication interruption.

SUMMARY OF THE INVENTION

The invention thus proposes an on-line service provision method, wherein in particular a service session supervision platform is placed between an access network and an input node of a service-hosting network. This method comprises the following steps in relation to at least one service:

a priori defining, in the running of said service, at least one atomic section consisting of a determined sequence of events which are involved in message exchanges with a subscriber, and identifying a first event at the start of the atomic section and at least one second event at the end of the atomic section; and configuring the supervision platform so that it detects the events identified in a session of said service in progress for a subscriber via the access network and flags a start of atomic section for said subscriber in response to the detection of the first event and an end of atomic section for said subscriber in response to the detection of a second event.

According to the invention, a communication interrupt request from a subscriber is processed by ascertaining whether an atomic section is in progress for said subscriber according to the atomic section beginnings and ends flagged by the supervision platform, in order to determine whether the communication must at least partly be interrupted immediately, that is to say whether some or all of the current sessions must be interrupted immediately.

If a service is interrupted in the middle of a sequence forming a semantically uniform and meaningful whole, this service is perceived as corrupted and aborted in an indeterminate state by its customer. More specifically, a more indepth analysis shows that numerous examples of 3G services thus contain sequences that cannot be interrupted without damage from the point of view of the QoS perceived by their consumer.

Such a sequence is here called an "atomic section" in reference to the terminology used in transaction-oriented information processing techniques, in which the atomicity of a transaction means that it must be considered as an indivisible operation, which can only be run in its entirety, or, failing this, be cancelled in its entirety.

The atomic sections do not necessarily relate to all of the services that can be accessed via the hosting network, but only those of these services for which there are sequences where the concept of atomicity applies.

As an example, services that use bids are run according to a generic schema normally comprising the following steps:

A/ the bidding application server proposes its bids;

B/ the customer notifies his desire to make a bid and sends a message to "deposit" his bid;

C/ the bidding application server notifies the customer that the bid has been "deposited" as it was received, and requests confirmation of this bid by the customer;

D/ the customer sends his confirmation;

E/ the server notifies "closure" of the bid deposited and confirmed by the customer;

F/ subsequently, the server notifies the customer of the result of his bid.

In this sequence of steps, it can be seen that, from step B/ to step E/, any interruption of the session supporting this bidding service will be perceived abruptly by the customer. Often, this customer does not know the exact status of the bid as it will be processed by the application server. Such uncertainty is by its very nature likely to make him reject the service.

For this bidding service, the sequence of events from step B/ to step E/ can therefore be qualified as an atomic section. A supervision platform, for example of the "SCP-like content mediation" type, can be arranged and configured according to the invention to detect such events, for example by examining as far as the application layer the IP packets exchanged with the customer during the session, and flagging them so that the interrupt requests that are likely to occur are processed wisely.

This processing of the interrupt requests involving the atomic sections can be performed in the IS of the CC&B at different levels: access network operator, ISP, content provider, content aggregator, site host, etc., according to whether these players are responsible for the rating of a certain part of the service as delivered.

As early as the design phase of a 3G service, the designer is normally able to identify all the atomic sections of this service. Furthermore, he is in a position to determine which event or action constitutes the point of entry into an atomic section, and which event or action characterizes the point of exit from the atomic section, and therefore to define the parameters used in the method. The method thus provides the 3G service developer with a toolbox with which he can, depending on the semantics of his service, parameter the supervision platform to avoid unwanted service interruptions.

It is considered that most of the on-line market-standard 3G services contain this concept of atomic section and therefore potentially benefit from the invention. Such is also the case for other services, in particular multimedia.

The communication relevant to the decision, taken by considering the existence or not of an atomic section for the subscriber, can relate to all of the current sessions for this subscriber or to just some of these sessions. If the request concerns the interruption of one session only, the examination of the atomic section condition can be limited to the session concerned.

Often, the request relates to all the sessions, for example, because it originates from the service transport rating. If there is an atomic section in progress in a service session, this session can be maintained (temporarily) while any other sessions in progress (with no atomic section at the time in question) can be interrupted immediately. The handler could also decide to maintain these other current sessions, particularly if they relate to related services.

The context handler can, in particular, observe a hierarchical structure of the services taken into account by the service rating devices. For example, in certain systems, the concept of "service cone" corresponding to a set of services likely to be involved in the context of a session of a given service (cone summit) is known. For example, the transport service can be seen as the apex of a cone made up of the transported services. One of these transported services can itself be the apex of a cone, which means that, while it is running, it can offer to access or return to other dependent services (belonging to this cone). In an embodiment of the invention, the processing of an interrupt request for a service S thus includes an analysis by the context handler of any atomic sections that might exist for sessions of any service belonging to the smallest of the nested cones including this service S, and the temporary maintenance of the current sessions for the services of this smallest cone if there is such an atomic section. The data specifying this cone can be at least partly accessible to the context handler so that it can perform this analysis. This analysis of the service hierarchy can also be undertaken by the entity originating from the interrupt request, which accordingly selects the sessions or the services for which the interruption is required.

Another aspect of the present invention relates to an on-line service control system, comprising a service session supervision platform placed between an access network and an input node of a service-hosting network, and a context handler to communicate with different functional units including the supervision platform in order to store information on service sessions in progress for subscribers via the access network. At least one atomic section consisting of a determined sequence of events which are involved in message exchanges with a subscriber is a priori defined in the running of at least one service by identifying a first event at the start of the atomic section and at least one second event at the end of the atomic section. The supervision platform includes means for detecting the events identified in a session of said service in progress for a subscriber via the access network and for flagging to the context handler a start of atomic section for said subscriber in response to the detection of the first event and an end of atomic section for said subscriber in response to the detection of a second event. The context handler includes means of keeping an atomic section indicator stored for each subscriber up-to-date on the basis of atomic section beginnings and ends flagged by the supervision platform and of processing a communication interrupt request from a subscriber according to the atomic section indicator stored for said subscriber in order to determine whether the communication must at least partly be interrupted immediately.

Another aspect of the present invention relates to a service session supervision platform for an on-line service control system, comprising:

means of connection on the one hand to an access network and on the other hand to an input node of a service-hosting network;

means of receiving specification elements of at least one atomic section in at least one on-line service, consisting of a determined sequence of events which are involved in message exchanges with a subscriber in the running of at least one service, said specification elements describing a first event at the start of the atomic section and at least one second event at the end of the atomic section;

means of analyzing traffic passing between the access network and the input node of the service-hosting network to detect said first and second events in a session of said service in progress for a subscriber via the access network; and means of communication with a context handler storing information on service sessions in progress for subscribers via the access network, including at least one atomic section indicator, to flag to the context handler a start of atomic section for said subscriber in response to the detection of the first event and an end of atomic section for said subscriber in response to the detection of a second event.

Another aspect of the present invention relates to a context handler for an on-line service control system, comprising:

means of communication with different functional units including a service session supervision platform placed between an access network and an input node of a service-hosting network;

means of storing information on service sessions in progress for subscribers via the access network, said information including, for at least one service session in progress for a subscriber, an atomic section indicator kept up-to-date on the basis of atomic section beginnings and ends flagged by the supervision platform; and means of processing a communication interrupt request from a subscriber according to the atomic section indicator stored for said subscriber in order to determine whether the communication must at least partly be interrupted immediately.

The developer can also, using this agent, define a maximum duration considered to be normal for a given atomic section.

Another aspect of the present invention relates to a software agent for an on-line service developer, comprising instructions for performing the following operations on running the software agent in a computer machine communicating with a service session supervision platform placed between an access network and an input node of a service-hosting network:

determination, in the running of a service, of at least one atomic section consisting of a determined sequence of events which are involved in message exchanges with a subscriber;

identification of a first event at the start of the atomic section and at least one second event at the end of the atomic section; and configuration of the supervision platform so that it detects the events identified in a session of said service in progress for a subscriber via the access network and flags a start of atomic section for said subscriber in response to the detection of the first event and an end of atomic section for said subscriber in response to the detection of a second event.

DESCRIPTION OF PREFERRED EMBODIMENTS

Figure 1:
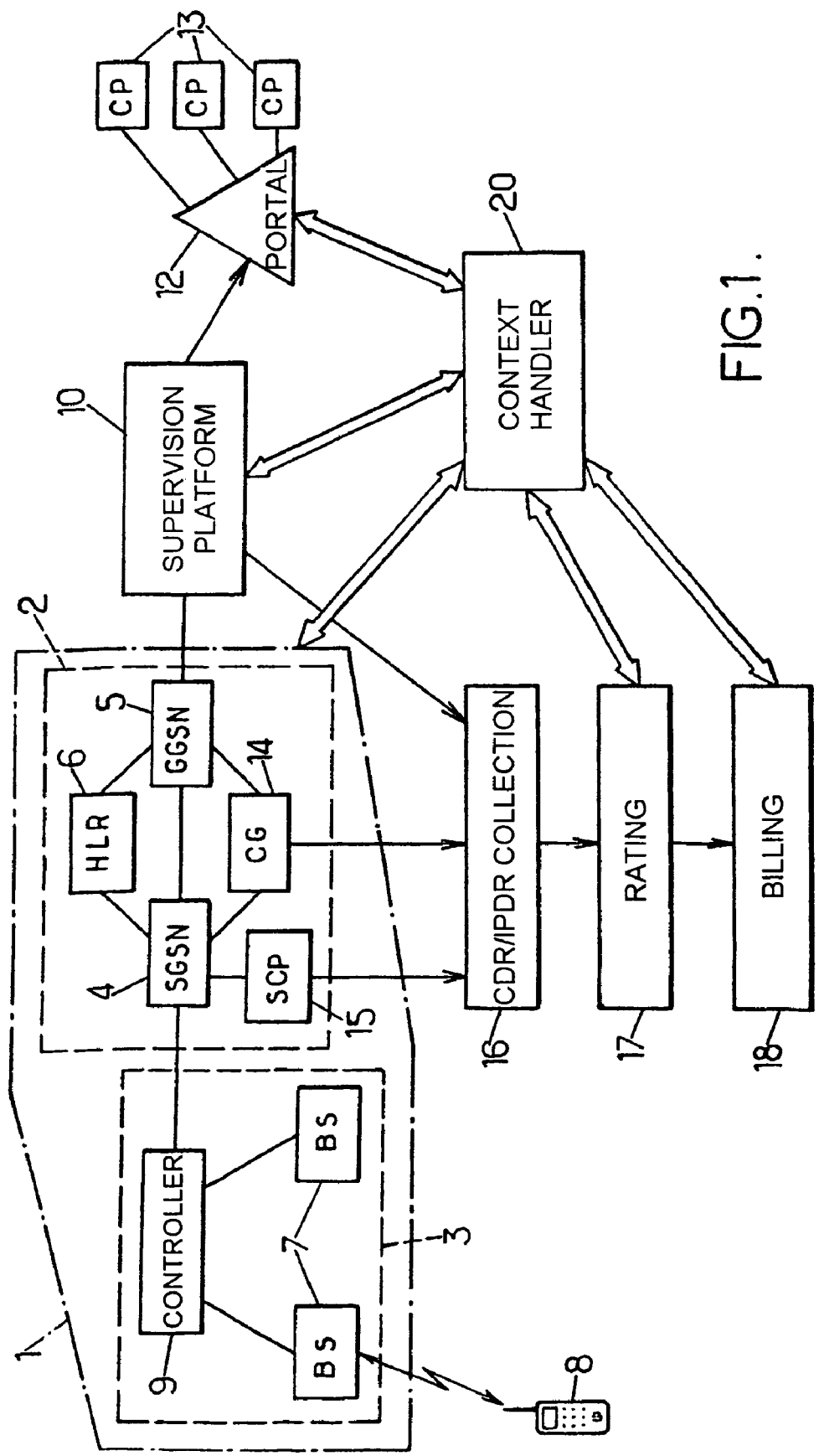
FIG. 1 is a diagram of a system according to the invention and its environment.

In the application of the invention described below, the services concerned are 3G services delivered to subscribers via a UMTS type access network 1. It will be understood that the access technology available to the subscribers can in fact be of any kind (local or wide area network, wired or wireless network, etc.).

A UMTS type third generation cellular radio network comprises on the one hand a core network 2 and on the other hand a radio access network 3. The core network 2 presents similarities with the GPRS (Generalized Packet Radio Service) technology, and thus includes a set of meshed switches called GSN (GPRS Support Node) including serving nodes 4, or SGSN (Serving GSN), linked to the radio access network 3 and gateway nodes 5, or GGSN (Gateway GSN), linked to external networks such as on-line service provision networks or the Internet. Some of the switches of the core network are linked to a subscriber database 6 (Home Location Register, HLR) used to manage the mobile subscribers of the cellular network. The radio access network 3, of UTRAN (UMTS Terrestrial Radio Access Network) type, for example, is made up of radio base stations 7 distributed over the coverage area of the network to offer radio links with the 3G terminals 8 and base station control units 9 linked to SGSNs 4.

At the interface between a GGSN 5 and an external network, there is often a service session supervision platform 10 of the "SCP-like content mediation" type. In the example represented in FIG. 1, this platform 10 is placed between the GGSN 5 and an Internet portal 12 giving access to services provided by various content providers (CP) 13.

The 3G terminals are designed to operate according to the IP protocol. The first router seen by the terminals of the subscribers of the operator managing the portal is the GGSN 5. The supervised IP traffic exchanged by these terminals 8 thus passes through the supervision platform 10 which is able to detect all sorts of events in this traffic. The events taken into account are programmable and the platform 10 offers the service developer programming tools with which to configure these events and the behaviors to be adopted when they are detected.

Conventionally, the switches of the core network 2 are linked to cellular service rating devices, either directly, or via a charging gateway (CG) 14, or via a service control point (SCP) 15 of an intelligent network architecture. These rating devices include, for example, a unit 16 for collecting call detail records (CDR) from the core network 2 and/or IP detail records (IPDR) resulting from the IP traffic analysis performed by the supervision platform 10, a rating system 17 which generates accounting data from the CDRs and IPDRs collected, and a billing system 18 for producing the customer bills from the rating elements supplied by the system 17.

The "SCP-like content mediation" type supervision platform 10 is provided with capabilities to implement all or most of the metrics representative of the rating of the 3G services. It generates CDRs, IPDRs or any other format of record intended for the rating system 17.

In some cases, rating devices can provoke an interruption of the information transport service for a given mobile subscriber. This may, for example, occur when the rating system 17 detects that a zero threshold has been reached in the account associated with the rating of the transport of the 3G service sessions for the subscriber. Such interruptions can also occur at the request of other CC&B components.

Other interrupt request cases can be induced by rating devices taking account of the 3G services. In particular, interrupt requests can take into consideration a service cone concept as described previously, either in how to generate these requests in the rating devices, or in how they should be processed.

The IS domain of the CC&B has the capability to deal with such session interruption cases non-abruptly, based on a real-time knowledge of the state of the sessions initiated by the user of the 3G terminal. More specifically, the invention provides for a functionally centralized mechanism for managing the context of all the service sessions initiated by each 3G subscriber. An IS component of the CC&B domain (in the broad sense) must therefore host and manage centrally the 3G service session contexts. This IS functional component 20 is here called a "context handler".

According to the invention, the context handler 20 is kept informed in real time of the starts and ends of atomic sections by the supervision platform 10, and it keeps, for each current 3G session for a subscriber, a Boolean variable up-to-date, the value of which indicates whether that session is in an atomic section.

An IS component issuing a session interrupt request (for example, the rating system 17) then transmits its request to the context handler 20 which looks at the overall situation of the activities of the subscriber. If one of his active sessions is in an atomic section, then the context handler 20 will be able to wait for the end of this atomic section before passing on the interrupt command, in accordance with an economic logic of the service concerned. A guard timer can be provided to protect the operator against an abnormally lengthy use of an atomic section.

The above mechanism therefore provides the operator with technical means enabling him to control and differentiate the processing of 3G service session interruption cases.

The context handler 20 can be incorporated in an existing IS component of the operator, such as the supervision platform 10 or the portal 12. It can also form a separate element as shown diagrammatically in FIG. 1.

The method requires an appropriate design and programming of the supervision platform 10 for it to detect events interpreted as starts and ends of atomic sections for each session of each subscriber.

The atomic sections are first identified by the designer of a 3G service, as are the events that mark their start and end. His application server can have an "agent" enabling him to communicate with the "SCP-like content mediation" type platform 10 to specify different events to be detected in the IP traffic related to the service (start/end of service session, start/end of each atomic section in such a session, etc.) and the actions required, including notifications to be addressed to the context handler 20 for it to keep the context of the sessions in progress up-to-date for the subscriber. The service provider can thus define, with an appropriate and secured application protocol, the data of the information model of his service.

A number of procedures can be used by the software agent made available to the service designer or developer. One possibility consists in submitting forms of predefined format, for example in the form of HTML (HyperText Markup Language) pages, that the agent completes and transmits to the platform 10 on the basis of data entered by the user. Another possibility consists in providing an exchange of successive messages between the agent and an additional software module of the platform 10 during which the agent sets up a communication session with the platform, enabling the user to indicate first his desire to specify an atomic section for a given server and then to be questioned to define the atomic section start or end event and optional parameters (for example, the timer $T_0$ parameter discussed later).

In the particular example of a bidding service, as explained above, the supervision platform 10 will be programmed to detect the messages corresponding to steps B/ (the customer 8 sends a message to deposit a bid) and E/ (the server 13 notifies closure of the bid deposited and confirmed) according to the format of these messages adopted in the implementation of the service.

Figure 2:
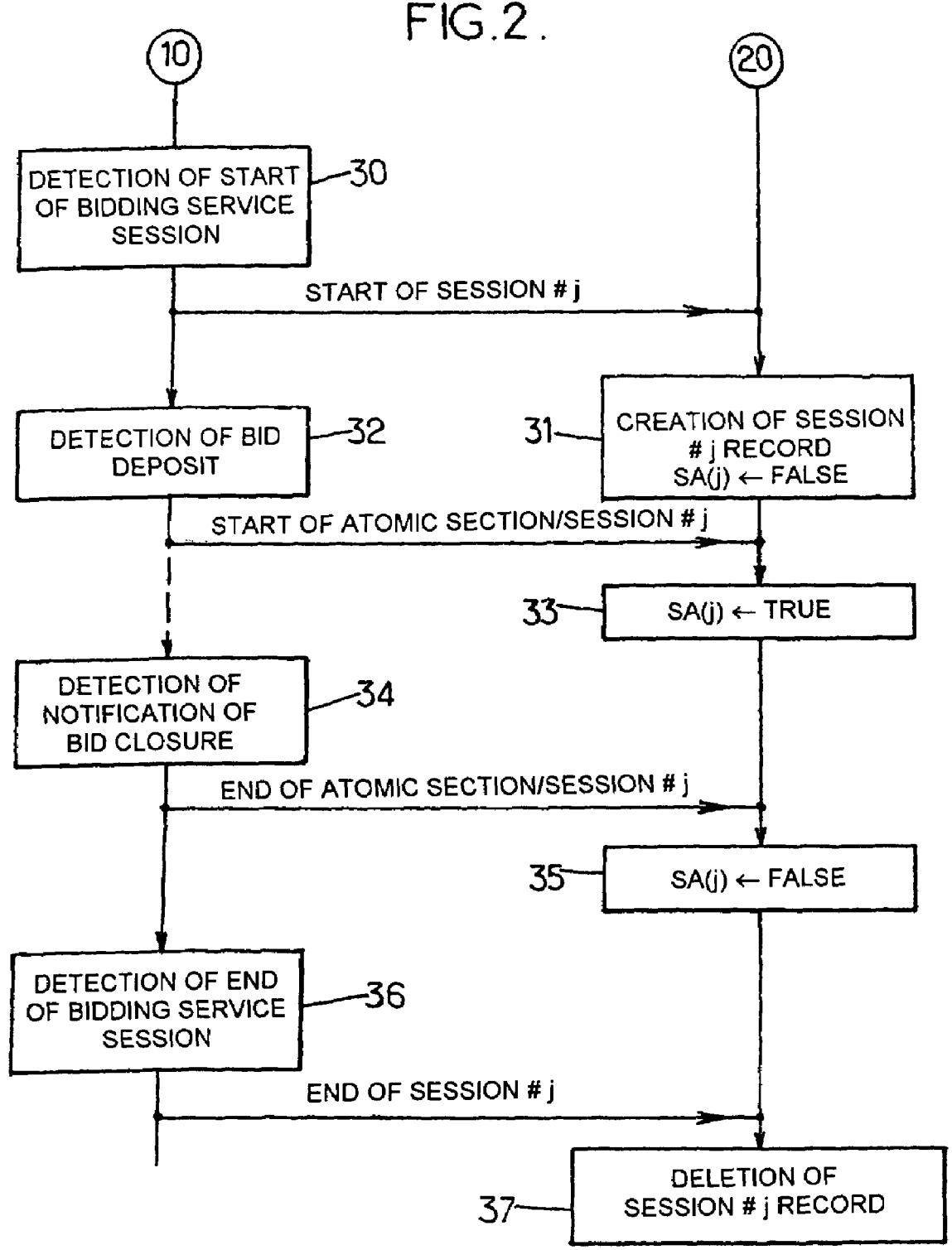
FIG. 2 is a diagram illustrating operations implemented in an exemplary system according to the invention for keeping an atomic section indicator up-to-date.

While the service is running, the supervision platform 10 and the context handler 20 cooperate for example in the way illustrated in FIG. 2.

The setting up of a service session for a subscriber is first detected by the platform 10 (step 30), which notifies the context handler 20 of this with a session number (j), so that the latter creates a record for this session (step 31), by initializing the atomic section Boolean indicator SA(j) to the value FALSE. If the subscriber previously had no session in progress, the step 31 includes the creation of a context for the subscriber with the first record. If the subscriber enters into a predefined atomic section (in our example, he deposits a bid), the corresponding message is detected by the platform 10 (step 32), which in real time notifies the context handler 20 of the start of atomic section in session number j. The context handler 20 then updates the atomic section indicator SA(j) in step 33, assigning it the value TRUE, and it notes down the time at which it was notified of the start of the atomic section. The supervision platform 10 also flags the exit from the atomic section, detected in step 34, to the context handler 20, so that the context handler can update the atomic section indicator SA(j) in step 35 by assigning it the value FALSE. Following the closure of the session, detected in step 36 by the platform 10, the context handler 20 deletes the record relating to the session j (and the context of the subscriber if the latter no longer has any 3G service session in progress).

A process of the type illustrated by FIG. 2 is conducted for each type of atomic section defined for each 3G service supporting the functionality.

Figure 3:
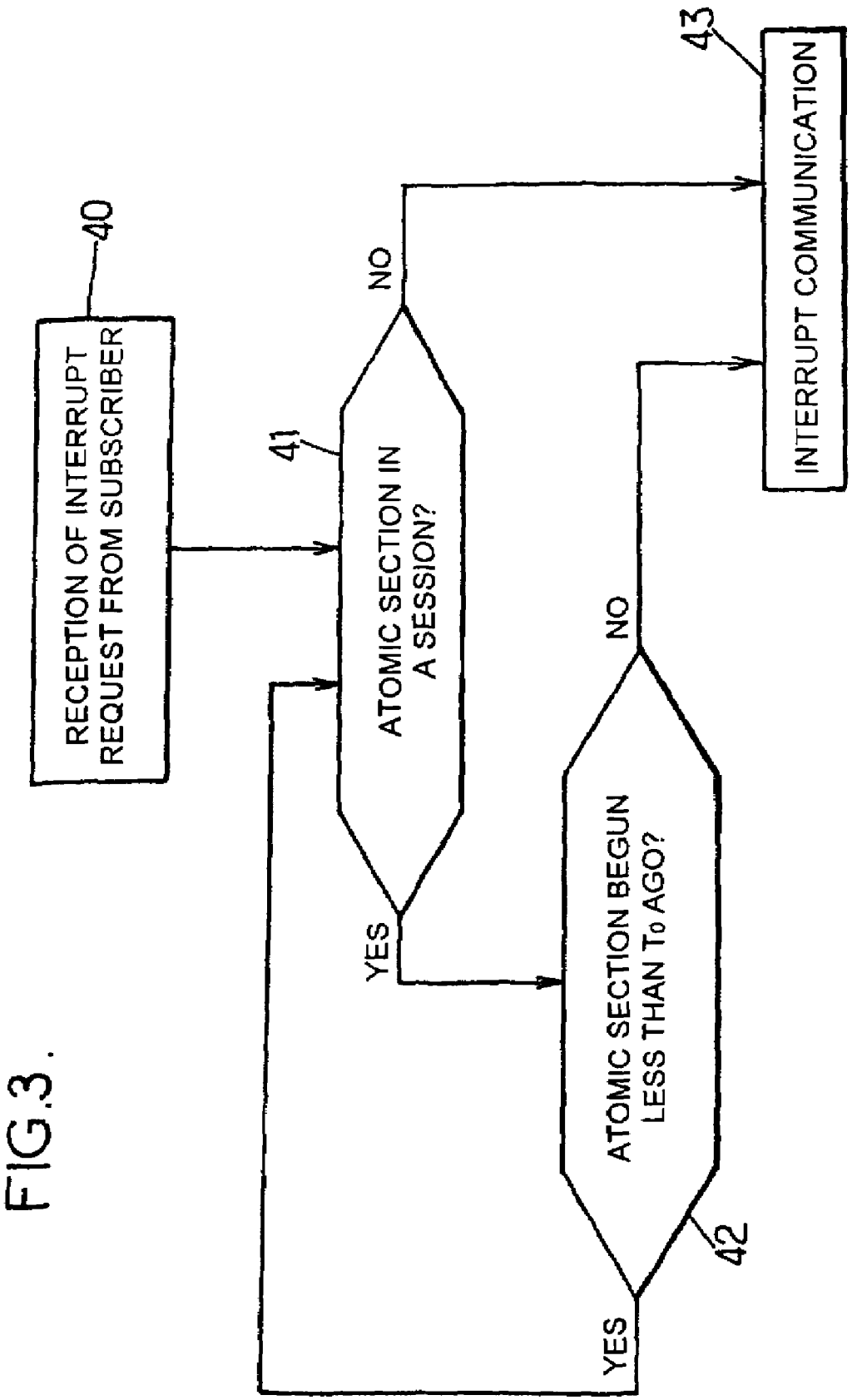
FIG. 3 is a flow diagram of a communication interrupt request processing procedure that can be used in a system according to the invention.

FIG. 3 illustrates an example of processing that the context handler 20 can apply following the receipt (step 40) of a communication interrupt request for an identified subscriber, for example generated by the rating system 17.

The handler 20 looks up the context that it stores for the subscriber concerned (step 41) to determine whether the latter has an atomic section in progress (SA(j)=TRUE for a session j of the subscriber). If he has, it compares the current time with the atomic section start time noted in the record j, to determine whether the atomic section began less than a predefined duration $T_0$ ago, for example around one minute (step 42). If this duration $T_0$ is not exceeded, the process returns to test 41, which means that the interrupt request is not served unless the indicator SA(j) returns to the value FALSE. The interruption of the communication is validated by the context handler 20 (step 43) only when test 41 reveals no atomic section in progress, or when the test 42 shows that the timer $T_0$ has expired. The context handler 20 then orders the supervision platform 10 to notify the customer of the impending interruption, followed by the core network 2, so that the latter can terminate the communication.

The interruption validation performed in the step 43 does not necessarily concern all the current sessions for the subscriber concerned, particularly in cases of differentiated service rating.

The interrupt request received in step 40 can in particular be selective, that is, concern only some of the sessions in progress for the subscriber, the screening of steps 41 and 42 being limited to these sessions. Such a case can occur if the rating system 17 incorporates a service cone processing logic and formulates its interrupt requests accordingly.

In another embodiment, the service cone processing logic is at least partly present in the context handler 20 which, when it receives an interrupt request for a given service, takes account of this logic when looking up the atomic section indicators and the decisions to interrupt the services.

The timer $T_0$ is optional. It protects the operator against abusive use of the atomic sections by the customer. To the same end, a mechanism can also be provided to prevent the customer from beginning a new atomic section in a circumstance where a communication interruption invoked by an IS component of the CC&B would not be carried out immediately because of an atomic section already in progress. The supervision platform 10 is then ordered to respond to the detection for this subscriber of an atomic section start type event by notifying him that his action cannot be pursued.

The duration $T_0$ can be chosen at the level of the context handler 20. It can also depend on the service or the type of atomic section concerned, and be chosen by the service designer and specified to the supervision platform 10 by the agent made available to the service designer. A number of methods can then be envisaged for implementing the timer. One of these consists in the platform 10 flagging an end of atomic section to the handler 20 when the timer, counted down by this platform 10 from the start of this atomic section, has timed out. Another possibility is for the platform 10 to indicate the duration $T_0$ to be taken into consideration to the handler 20 at the same time as it flags the start of the atomic section.

The invention claimed is:

1. An on-line service provision method, wherein a service session supervision platform is placed between an access network and an input node of a service-hosting network, the method comprising the following steps in relation to at least one service:
   a priori defining, in the running of said service, at least one atomic section consisting of a determined sequence of events involved in message exchanges with a subscriber, and identifying a first event at the start of the atomic section and at least one second event at the end of the atomic section; and
   configuring the supervision platform so that said supervision platform detects the events identified in a session of said service in progress for a subscriber via the access network and flags a start of atomic section for said subscriber in response to the detection of the first event and an end of atomic section for said subscriber in response to the detection of a second event,
wherein a communication interrupt request from a subscriber is processed by ascertaining whether an atomic section is in progress for said subscriber according to the atomic section beginnings and ends flagged by the supervision platform, in order to determine whether the communication must at least partly be interrupted immediately.

2. The method as claimed in claim 1, wherein, in response to a communication interrupt request for a subscriber, the immediate interruption of the communication is prevented when said subscriber has an ongoing atomic section for at least one service.

3. The method as claimed in claim 1, wherein, in response to a communication interrupt request for a subscriber, the immediate interruption of the communication is prevented when said subscriber has an ongoing atomic section for at least one service started less than a predetermined time ago.

4. The method as claimed in claim 3, wherein said predetermined duration is specified to the supervision platform for each atomic section.

5. The method as claimed in claim 1, wherein a context handler is provided to communicate with different functional units including the supervision platform, to store information on service sessions in progress for subscribers via the access network, said information comprising an atomic section indicator kept up-to-date for each subscriber based on atomic section beginnings and ends flagged by the supervision platform.

6. The method as claimed in claim 1, wherein the access network comprises a cellular radio communication network.

7. The method as claimed in claim 1, wherein the input node of the service-hosting network comprises an Internet portal.

8. An on-line service control system, comprising a service session supervision platform placed between an access network and an input node of a service-hosting network, and a context handler to communicate with different functional units including the supervision platform in order to store information on service sessions in progress for subscribers via the access network, wherein at least one atomic section consisting of a determined sequence of events which are involved in message exchanges with a subscriber is a priori defined in the running of at least one service by identifying a first event at the start of the atomic section and at least one second event at the end of the atomic section, the supervision platform—including means for detecting the events identified in a session of said service in progress for a subscriber via the access network and for flagging to the context handler a start of atomic section for said subscriber in response to the detection of the first event and an end of atomic section for said subscriber in response to the detection of a second event, the context handler including means of keeping an atomic section indicator stored for each subscriber up-to-date on the basis of atomic section beginnings and ends flagged by the supervision platform and of processing a communication interrupt request from a subscriber according to the atomic section indicator stored for said subscriber in order to determine whether the communication must at least partly be interrupted immediately.

9. A computer-readable medium embodying instructions that cause a computer to perform a method for implementing a software agent for an on-line service developer, for performing the following operations on running the software agent in a computer machine communicating with a service session supervision platform placed between an access network and an input node of a service-hosting network, the method comprising:
   determining, in the running of a service, of at least one atomic section consisting of a determined sequence of events involved in message exchanges with a subscriber;
   identifying of a first event at the start of the atomic section and of at least one second event at the end of the atomic section; and
   configuring of the supervision platform so that it detects the events identified in a session of said service in progress for a subscriber via the access network and flags a start of atomic section for said subscriber in response to the detection of the first event and an end of atomic section for said subscriber in response to the detection of a second event.

10. The computer-readable medium comprising instructions for the software agent as claimed in claim 9, wherein the supervision platform configuration operation performed on running the software agent includes a configuration of the supervision platform so that said supervision platform flags atomic section beginnings and ends to a context handler storing information on service sessions in progress for subscribers via the access network, including at least one atomic section indicator.

* * * * *